US010587412B2

(12) United States Patent
De Lima Junior et al.

(10) Patent No.: US 10,587,412 B2
(45) Date of Patent: Mar. 10, 2020

(54) VIRTUAL MACHINE STRUCTURE

(71) Applicant: INTERNATIONAL BUSINESS MACHINES CORPORATION, Armonk, NY (US)

(72) Inventors: Juscelino Candido De Lima Junior, Campinas (BR); Breno H. Leitao, Araraquara (BR); Fabio M. Tanada, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/805,378

(22) Filed: Nov. 7, 2017

(65) Prior Publication Data

US 2019/0140831 A1    May 9, 2019

(51) Int. Cl.
*G06F 9/455* (2018.01)
*H04L 9/32* (2006.01)
(Continued)

(52) U.S. Cl.
CPC ........ *H04L 9/3226* (2013.01); *G06F 9/45558* (2013.01); *G06F 9/5016* (2013.01);
(Continued)

(58) Field of Classification Search
CPC .......... G06F 21/10; G06F 21/12; G06F 21/53; G06F 21/60; G06F 21/62; G06F 9/455;
(Continued)

(56) References Cited

U.S. PATENT DOCUMENTS 8,181,176 B2   5/2012   Zhou et al.
8,972,746 B2   3/2015   Johnson et al.
(Continued)

FOREIGN PATENT DOCUMENTS

WO   WO2014081608 A1   5/2014

OTHER PUBLICATIONS

Mills et al. "VMware Horizon 6 Desktop Virtualization Solutions: Virtual Enclaves" [Online], Sep. 2014 [Retrieved on: Jun. 21, 2019]; ch.9 sec.3, Packt Publishing, Retrieved from: < https://learning.oreilly.com/library/view/vmware-horizon-6/9781782170709/ch09s03.html > (Year: 2014).*

(Continued)

*Primary Examiner* — Eric W Shepperd
(74) *Attorney, Agent, or Firm* — Patrick J. Daugherty; Daugherty & Del Zoppo Co., LPA

(57) ABSTRACT

Aspects provide for a virtual machine structure wherein processors are configured to create an encrypted code virtualization machine for code machine instructions of a retrieved package that has a security field value that indicates secure code, wherein the code machine instructions of the first retrieved package are allocated to encrypted code memory regions of a computer memory resource. Configured processors further create a non-encrypted code virtualization machine in non-encrypted code memory regions of a computer memory resource comprising code machine instructions of another retrieved package that has a security field value that does not indicate secure code; and define a union mixed secure virtual machine image to include (as a function of) the encrypted code virtualization machine and the non-encrypted code virtualization machine.

20 Claims, 5 Drawing Sheets

(51) Int. Cl.
 *G06F 12/14* (2006.01)
 *G06F 9/50* (2006.01)
 *H04L 9/08* (2006.01)

(52) U.S. Cl.
 CPC ........ *G06F 12/1408* (2013.01); *H04L 9/0894* (2013.01); *G06F 2009/4557* (2013.01); *G06F 2009/45562* (2013.01); *G06F 2009/45579* (2013.01); *G06F 2009/45583* (2013.01); *G06F 2009/45587* (2013.01); *G06F 2009/45595* (2013.01); *G06F 2212/1052* (2013.01)

(58) Field of Classification Search
 CPC ............. G06F 9/45545; G06F 9/45558; G06F 9/45562; G06F 9/45579; G06F 9/45583; G06F 9/45587; G06F 9/45595; G06F 9/5016; G06F 12/1408
 See application file for complete search history.

(56) References Cited

U.S. PATENT DOCUMENTS

| | | | |
|---|---|---|---|
| 9,148,428 B1* | 9/2015 | Banga | G06F 9/5027 |
| 9,246,690 B1 | 1/2016 | Roth et al. | |
| 9,300,640 B2 | 3/2016 | Pate | |
| 9,740,880 B1* | 8/2017 | Natanzon | H04L 63/0428 |
| 9,762,385 B1* | 9/2017 | Sun | H04L 9/0625 |
| 9,977,880 B2 | 5/2018 | Chambers et al. | |
| 10,365,909 B2 | 7/2019 | Clothier et al. | |
| 2002/0184046 A1* | 12/2002 | Kamada | G06F 21/121 |
| | | | 705/67 |
| 2005/0005103 A1* | 1/2005 | Atkin | G06F 21/52 |
| | | | 713/165 |
| 2009/0265708 A1* | 10/2009 | Nakajima | G06F 9/45558 |
| | | | 718/1 |
| 2011/0035601 A1* | 2/2011 | Davidson | G06F 21/14 |
| | | | 713/190 |
| 2012/0110328 A1* | 5/2012 | Pate | G06F 21/6218 |
| | | | 713/165 |
| 2012/0233678 A1* | 9/2012 | Pal | G06F 21/445 |
| | | | 726/7 |
| 2012/0266231 A1* | 10/2012 | Spiers | H04L 63/0218 |
| | | | 726/12 |
| 2012/0324446 A1* | 12/2012 | Fries | G06F 21/64 |
| | | | 718/1 |
| 2014/0123230 A1* | 5/2014 | Farina | G06F 21/53 |
| | | | 726/4 |
| 2014/0229686 A1* | 8/2014 | Tsirkin | G06F 9/45533 |
| | | | 711/147 |
| 2015/0019864 A1* | 1/2015 | Pate | G06F 21/53 |
| | | | 713/168 |
| 2015/0089502 A1 | 3/2015 | Horovitz et al. | |
| 2015/0100957 A1* | 4/2015 | Botzer | G06F 9/45558 |
| | | | 718/1 |
| 2015/0160956 A1* | 6/2015 | Shah | H04L 63/10 |
| | | | 718/1 |
| 2015/0378849 A1* | 12/2015 | Liu | G06F 16/188 |
| | | | 711/162 |
| 2016/0036826 A1 | 2/2016 | Pogorelik et al. | |
| 2016/0042184 A1 | 2/2016 | Mckeen et al. | |
| 2016/0171248 A1 | 6/2016 | Nesher et al. | |
| 2017/0288863 A1 | 10/2017 | Dimitrakos et al. | |
| 2018/0095899 A1* | 4/2018 | Durham | G06F 12/0831 |
| 2018/0373553 A1* | 12/2018 | Connor | G06F 9/45558 |
| 2019/0042780 A1* | 2/2019 | Brannock | G06F 21/64 |
| 2019/0065230 A1* | 2/2019 | Tsirkin | G06F 9/45558 |
| 2019/0095357 A1* | 3/2019 | Ozsoy | G06F 12/1441 |
| 2019/0109877 A1* | 4/2019 | Samuel | H04L 63/1441 |

OTHER PUBLICATIONS

Peter Mell et al, The NIST Definition of Cloud Computing, National Institute of Standards and Technology, Publication 800-145, 2011, entire document.

Ramya Jayaram Masti et al, An Architecture for Concurrent Execution of Secure Environments in Clouds, CCSW'13, Proceedings of the 2013 ACM Workshop on Cloud Computing Security Workshop, 2013, pp. 11-22.

Frank Mckeen et al, Innovative Instructions and Software Model for Isolated Execution, Intel Corporation, 2013, pp. 1-8.

Dimitry Evtyushkin et al, Iso-X: A Flexible Architecture for Hardware-Managed Isolated Execution, MICRO-47 Proceedings of the 47th Annual IEEE/ACM International Symposium on Microarchitecture, 2014, pp. 190-202.

* cited by examiner

VIRTUAL MACHINE STRUCTURE

BACKGROUND

A virtual machine (VM) is an emulation of a computer system. Virtual machines are based on computer architectures and provide functionality of a physical computer. A VM image includes an operating system and all computer memories attached to a virtual machine when the image is created. A VM image that contains only a generalized operating system is basically the same as an original type of image, an operating system (OS) image.

A hypervisor or virtual machine monitor (VMM) is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources. This contrasts with operating-system-level virtualization, where all instances (usually called containers) must share a single kernel, though the guest operating systems can differ in user space.

Cloud computing is a model of service delivery for enabling convenient, on-demand network access to a shared pool of configurable computing resources (e.g., networks, network bandwidth, servers, processing, memory, storage, applications, virtual machines, virtual machine images, and services) for data handling and processing. Computer program memories used within cloud structures may be categorized as "read-only," wherein values of variables can be altered at run time; or "read-only," containing static constants rather than variables.

Virtual machines generally segment computer memories into different, discrete segments for differential processing of machine instructions (code or text) and associated data within a package: conventionally, the machine instructions into a code segment, and the associated data into a data segment, a Basic Service Set (BSS) segment, a stack segment and a heap segment.

The code segment, also known as a text segment or simply as text, is where a portion of an object file or the corresponding section of the program's virtual address space that contains executable instructions (machine code, etc.) is stored.

The data segment (sometimes denoted as ".data") is a portion of an object file or a corresponding virtual address space of a program that contains initialized static variables which have a pre-defined value and can be modified, and any variables that are not defined within a function (and thus can be accessed from anywhere) or are defined in a function but are defined as static so they retain their address across subsequent calls. The values for these variables are initially stored within read-only memory areas and copied into the .data segment during the start-up routine of the program. The size of a data segment is determined by the size of the values in program source code, and does not change at run time. Data segment regions within memory are generally of read-only type and of fixed size.

The Basic Service Set (BSS) segment, also known as uninitialized data, is usually adjacent to the data segment. The BSS segment contains all global variables and static variables that are initialized to zero or do not have explicit initialization in source code. For instance, a variable defined as static "int i;" would be contained in the BSS segment.

The heap is an area of memory used for dynamic allocations, meaning that blocks of memory can be allocated and freed in an arbitrary order and accessed multiple times (as opposed to the stack, which is Last-In-First-Out (LIFO). Heap segments commonly begin at the end of the BSS and data segments and grows to larger addresses from there.) The heap area is managed to adjust its size and shared by all threads, shared libraries, and dynamically loaded modules in a process.

The stack area contains the program stack, a LIFO structure, typically located in the higher parts of memory. A "stack pointer" register tracks the top of the stack; it is adjusted each time a value is "pushed" onto the stack. The set of values pushed for one function call is termed a "stack frame". A stack frame consists at minimum of a return address. Automatic variables are also allocated on the stack. The stack area conventionally adjoins the heap area and they grow towards each other; thus, when the stack pointer meets the heap pointer, free memory is generally exhausted within the memory. Within large address spaces and virtual machine implementations stack and heap areas tend to be placed more freely, but still typically grow in a converging direction relative to each other.

SUMMARY

In one aspect of the present invention, a computerized method for a virtual machine structure includes executing steps on a computer processor. Thus, a computer processor is configured to create an encrypted code virtualization machine for code machine instructions of a first retrieved package that has a security field value that indicates secure code, wherein the code machine instructions of the first retrieved package are allocated to encrypted code memory regions of a computer memory resource. The configured processor further creates a non-encrypted code virtualization machine in non-encrypted code memory regions of a computer memory resource comprising code machine instructions of a second retrieved package that has a security field value that does not indicate secure code; and defines a union mixed secure virtual machine image to include (as a function of) the encrypted code virtualization machine and the non-encrypted code virtualization machine.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to create an encrypted code virtualization machine for code machine instructions of a first retrieved package that has a security field value that indicates secure code, wherein the code machine instructions of the first retrieved package are allocated to encrypted code memory regions of a computer memory resource. The configured processor further creates a non-encrypted code virtualization machine in non-encrypted code memory regions of a computer memory resource comprising code machine instructions of a second retrieved package that has a security field value that does not indicate secure code; and defines a union mixed secure virtual machine image to include (as a function of) the encrypted code virtualization machine and the non-encrypted code virtualization machine.

In another aspect, a computer program product for a virtual machine structure has a computer-readable storage medium with computer readable program code embodied therewith. The computer readable hardware medium is not a transitory signal per se. The computer readable program code includes instructions for execution which cause the processor to create an encrypted code virtualization machine for code machine instructions of a first retrieved package that has a security field value that indicates secure code, wherein the code machine instructions of the first retrieved package are allocated to encrypted code memory regions of a computer memory resource. The processor is further caused to create a non-encrypted code virtualization machine in non-encrypted code memory regions of a computer memory resource comprising code machine instructions of a second retrieved package that has a security field value that does not indicate secure code; and to define a union mixed secure virtual machine image to include (as a function of) the encrypted code virtualization machine and the non-encrypted code virtualization machine.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
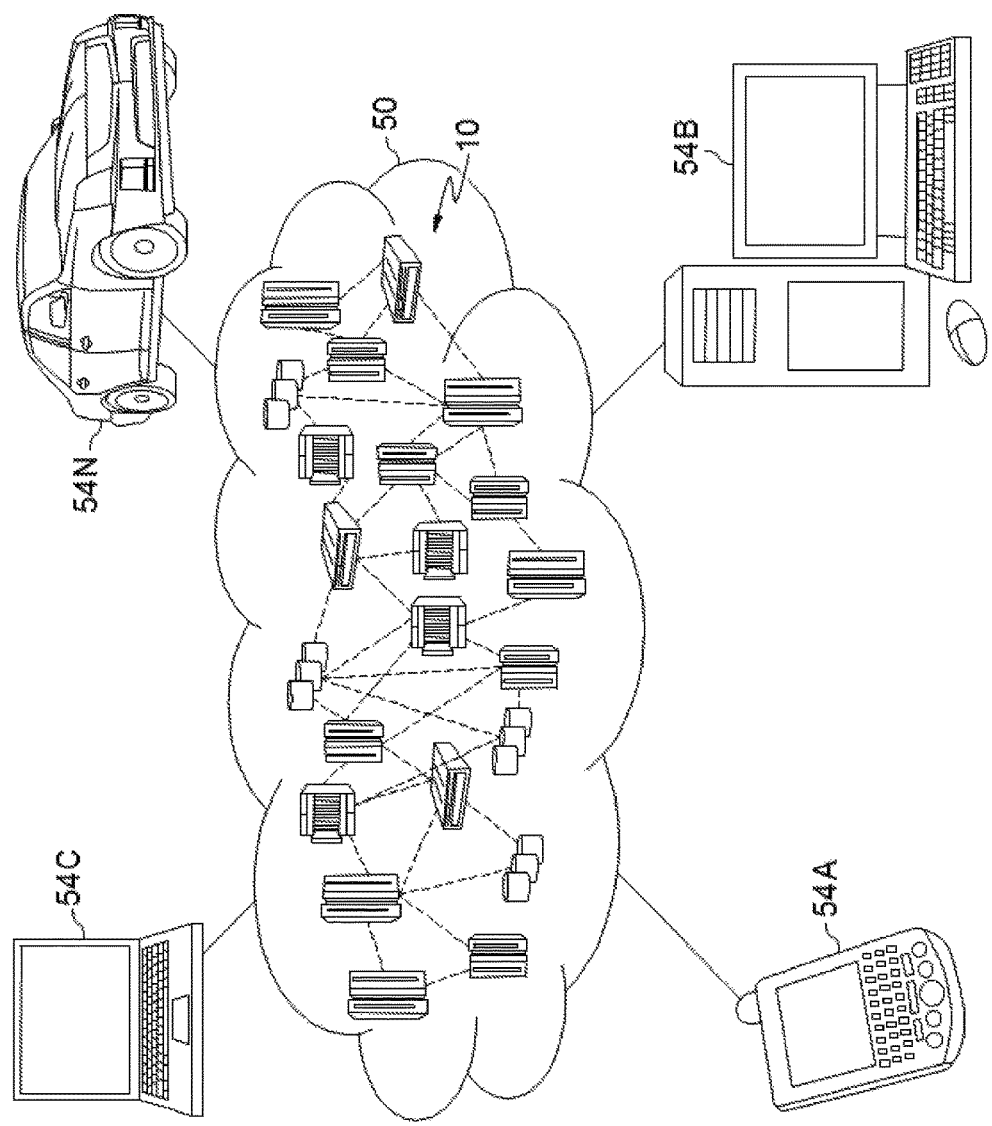
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
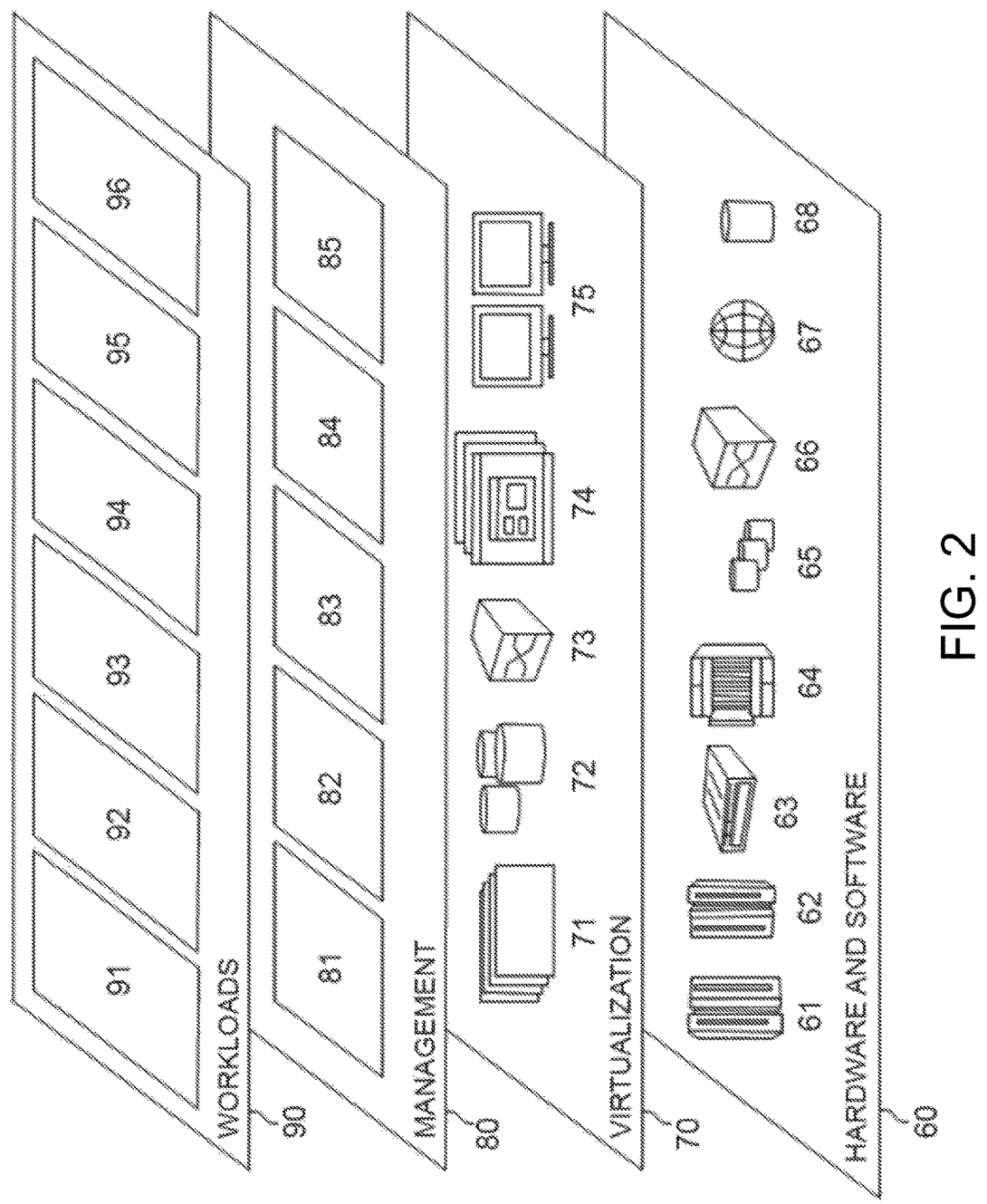
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a virtual machine structure according to aspects of the present invention 96.

Figure 3:
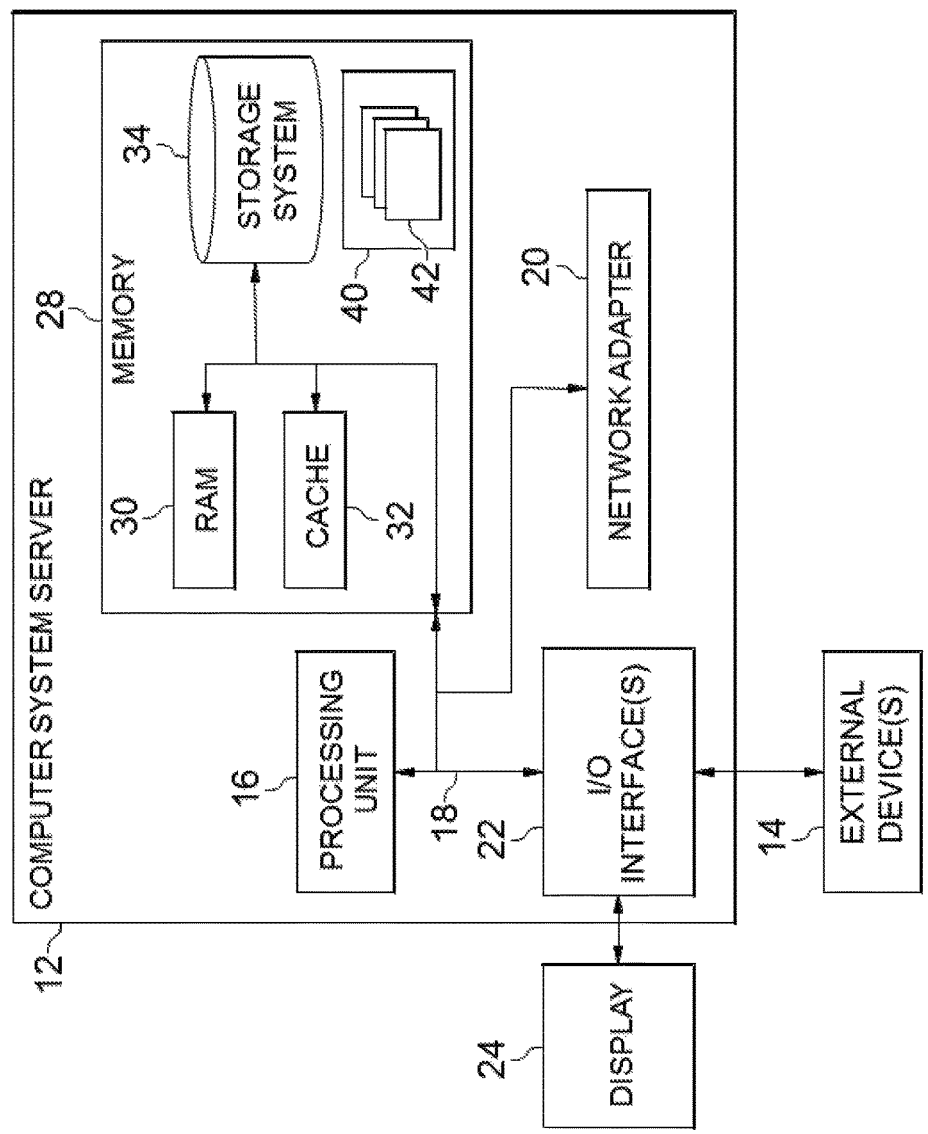
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
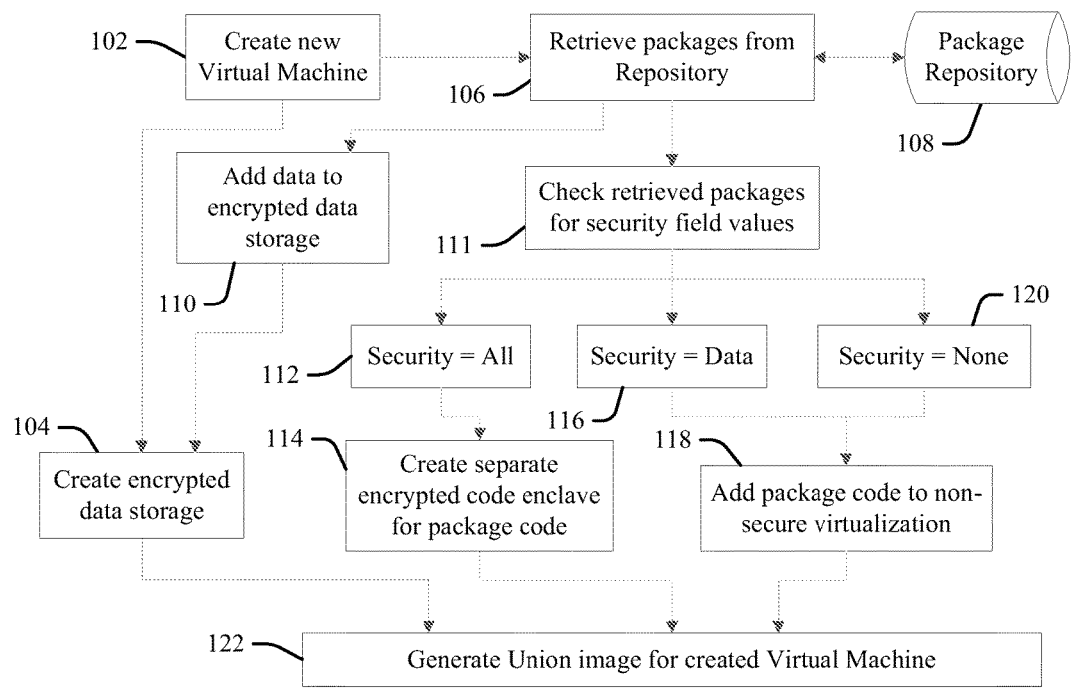
FIG. 4 is a flow chart illustration of an embodiment of the present invention.

FIG. 4 illustrates a virtual machine structure according to the present invention. At 102 a processor configured according to an aspect of the present invention (the "configured processor") initiates creation of a new virtual machine, including creating encrypted or otherwise secure portions of a computer memory resource for storage of package data at 104.

At 106 the configured processor retrieves packages from a package repository 108. The retrieved packages are distributions of software and data in archive files that include metadata (software name, description of its purpose, version number, vendor, checksum values, a list of dependencies necessary for the software to run properly, etc.) that includes a "security" field value.

At 110 the configured processor securely stores (encrypts) data from the retrieved packages into the encrypted data storage 104. Via use of the encrypted data storage 104 structure the configured processor encrypts and/or otherwise provides restricted access to data stored from the packages. Examples of the encrypted data storage 104 include a virtual machine operating on a remote server, wherein the virtual machine is isolated from other components of the virtual machine and restricts users of the virtual machine from downloading data files or parts of data files to their own, physical computer. The configured processor may also generally restrict external access to the encrypted data, preventing users from emailing, copying, or otherwise moving files outside of the secure encrypted data storage 104 environment, accidentally or intentionally.

At 111 the configured processor checks the value of the security field within each of the retrieved packages.

In response to determining at 112 that the value of the security field for a retrieved package indicates that the package code is secure code and that the data is secure data (in the present embodiment, that the value is "All", though other embodiments may use other values), the configured processor creates separate "code enclaves" for the code of each retrieved package at 114. The code enclaves are secure virtualization or virtual machine in which the machine instructions of the software package are allocated to and executed within their own encrypted memory regions. ("Enclave" may herein generally refer to a secure virtual machine, or the part of it that runs on encrypted memory.)

In response to determining at 116 that the value of the security field for a retrieved package is "Data," indicating encryption or security is needed only for the data, and not for the code, of the associated package, the configured processor adds the package code to a non-secure code virtualization at 118.

In response to determining at 120 that the value of the security field for a retrieved package is "None," indicating no encryption or security needed for the code or the data of the associated package, the configured processor adds the package code to the non-secure code virtualization at 118.

At 122 the configured processor generates a unified (union) mixed secure virtual machine image for the created virtual machine that comprises the data encrypted data storage 104, the non-secure code virtualization created at 118, and each of the separate encrypted enclaves created at 114 for each of the code portions of the different packages that have the security field value of "All."

Figure 5:
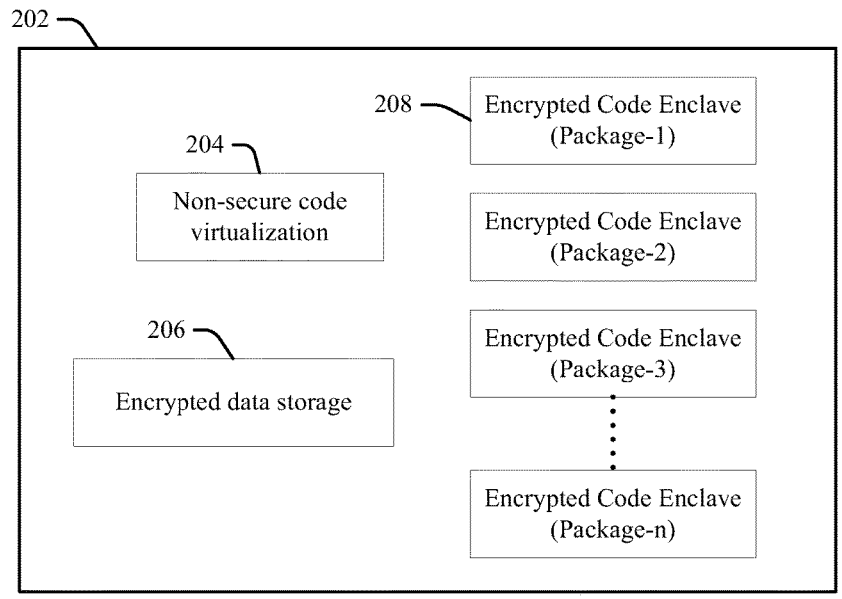
FIG. 5 is a block diagram illustration of an embodiment of the present invention.

FIG. 5 is a block diagram illustration of a mixed secure virtual machine image 202 that is generated via the process or system of FIG. 4, comprising encrypted data storage 206 (created at 104, FIG. 4); a non-secure code virtualization 204 (created at 118, FIG. 4); and a plurality of "n" different encrypted code enclaves 208 (each created at a separate iteration of 114 in FIG. 4), one for each of "n" packages that are determined to have security field values of "All" (at 112 of FIG. 4).

Software and system data packages used to define virtual machines structures have two major sections: a code (or text) section that includes the machine instructions text used to run the software that touches data within the other section; and the data section that includes data that is processed (".xls" files, etc.), and other data that is not part of the processed data, such as memory allocations or memory parts. In the prior art code section instructions are generally treated as public, non-confidential or non-secure information, wherein everyone has access to the instructions to run the software.

However, some portions of the machine instructions text within a given package may be considered proprietary or confidential, wherein it is desirable for that other information to be secure. For example, a secure connection to an electronic commerce ("e-commerce") web site may acquire personal information of a customer (credit card number, user log-in and password indicia, etc.) that is confidential (secure) data and not part of public, non-secure file data associated with a purchase transaction (the file or files defining the identity or attributes of the item). Accordingly, aspects of the present invention identify confidential portions of the machine instructions text as distinguished from remaining, non-confidential portions, and generate separate, secure virtual machines ("encrypted code enclaves") for each such package. Other, non-secure portions of the machine instructions from the software packages are allocated to and executed within a traditional, non-secure virtualization (virtual machine).

Aspects of the present invention provide an infrastructure that speeds up memory accesses, deployments and usage relative to prior art approaches to secure package data. The aspects start-up (initialize) within package operating system code, providing package information that allows the creation of a virtual machine that is faster than a traditional secure enclave, but, still secure with respect the portions of package code that are confidential. Thus, packages within a repository are categorized in different security permissions: packages that needs to be 100% secure (and therefore run inside an encrypted code enclave); packages wherein the text code does not need to be secure, since it does not contain confidential information, but the package handles secure user data, so that while the text could be deployed in a traditional VM, the data should be inside an encrypted data enclave; and packages that do not handle secure information at all.

By utilized security field data (or "tagging information") within the packages, once a virtual machine is deployed or bootstrapped, it will contain two major parts: one side that is secure (inside the encrypted enclave), and another part that is hosted outside of the enclave. Encryption and other security measures generally slow down access speeds to data relative to non-encrypted or non-secure memory and virtualization processes. Thus, allocating amounts of the non-secure code to unencrypted memory resources proportionately speeds up virtual machine deployment and access within aspects of the present invention, relative to prior art approaches that assign all package code to encrypted virtualization when any of the package code should be protected.

Secured, encrypted code virtualization is a composition of a plurality of individual sub-enclaves, using the concept of a multi-trusted execution environment defined by the generated union mixed secure virtual machine image (at 122, FIG. 4). Embodiments speed up secure virtual machine execution by minimizing secure enclave size in proportion to the amount of package code that is allocated instead to the non-secure virtualization 204, creating a "mixed secure virtual machine" structure that keeps secure only those package code portions that need to be secure, while using traditional, non-secure access for faster access to the other pieces of software that do not require security. The security field tags a package on an operating system (OS) repository for security information, using the package tagging for mapping to indicate if a package should be deployed inside a secure enclave or on a traditional VM layer, and splitting data from the packages, even if the package is a secure package.

An illustrative but not limiting or exhaustive example of a repository package incorporating a security field according to the present invention is the following Ubuntu package:
 Source: nvme-cli
 Maintainer: Ubuntu Developers <ubuntu-devel-discuss@lists.ubuntu.com>XSBC
 Original-Maintainer: Breno Leitao bl@BIGCORP.com
 Section: admin
 Security: All
 Priority: optionalStandards-
 Version: 3.9.8
 Build-Depends: debhelper (>=9), libudev-devHomepage:

Thus, when this example Ubuntu package starts to run on the virtualization level, the "Security" field value of "All" automatically causes the configured processor executing the package code to create an encrypted code enclave within memory for the package code. Thus, when a new virtual machine image is created, a plurality of virtual machines is split into different parts: into a regular virtual machine which contains unsecure packages that do not have secure requirements, and separated parts for the enclaves for secure codes from individual package.

Virtual machine images are conventionally defined as a single file (for example, as a "qcow2" file for a Kernel-based Virtual Machine (KVM) or a Quick EMUlator (QEMU) hypervisor). In contrast, aspects of the present invention define a virtual machine image as a union of small files that contains separate parts, wherein each separated part will be deployed on either its own enclave, or on a traditional virtualization infrastructure.

Code enclave sizes are a factor to consider in deploying memory encryption technologies architecture to protect code contents when the OS, VMM (Virtual Machine Monitor), or BIOS are compromised. Conventional architectures require that all the functionality inside an enclave is statically linked-in at provisioning time. This creates a performance/size trade-off, where providing encrypted security for package code proportionately decreases processing and memory access speed as the size of the encrypted code portions increase, and accordingly developers must carefully balance security and speed considerations in designing a given virtualization.

Aspects of the present invention enhance security by protecting data between the individual code enclaves, by providing each enclave with its own memory, wherein neither a hypervisor nor anyone else can read/access the enclave memory originally written by a given enclave. This design characteristic prohibits memory sharing, while improving the efficiencies of deployment of new enclaves, via splitting the memory pages between secure and unsecure memory (thereby reducing the total amount of memory that must be dedicated to the enclaves.

Figure 6:
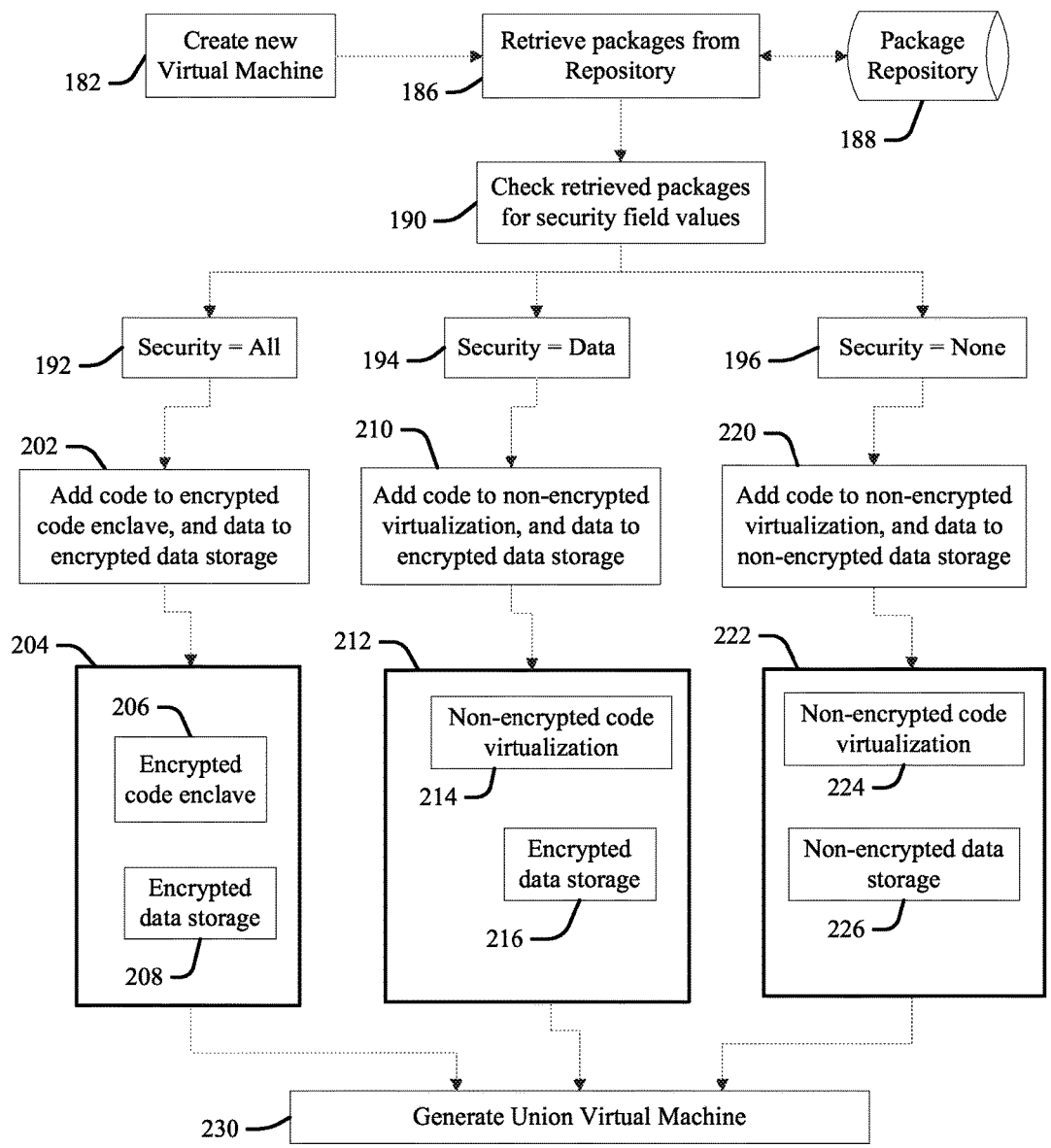
FIG. 6 is a flow chart illustration of an alternative embodiment of the present invention.

FIG. 6 illustrates an alternative embodiment virtual machine structure derived as a function of package security field values the according to the present invention. At 182 a processor configured according to an aspect of the present invention (the "configured processor") initiates creation of a new virtual machine, and at 186 retrieves packages from a package repository 188 that include "security" field values as described above with respect to FIG. 4. At 190 the configured processor checks the value of the security field within each of the retrieved packages.

In response to determining at 192 that the value of the security field for a retrieved package is "All", at 202 the configured processor adds the package code to a secure code enclave 206, and the data to a secure data enclave 208, within a secure hypervisor 204.

In response to determining at 194 that the value of the security field for a retrieved package is "Data," at 210 the configured processor adds the package code to a traditional (unsecure) code virtualization 214, and the data to a secure data enclave 216, that define a mixed secure hypervisor 212.

In response to determining at 196 that the value of the security field for a retrieved package is "None," at 220 the configured processor adds the package to a traditional (non-secure) code virtualization 224, and the data to an unsecure (public) memory storage 226 that defines a traditional, unsecure virtualization hypervisor 222.

At 230 the configured processor generates a unified (union) virtual machine image that comprises the secure hypervisor 204, the mixed secure hypervisor 212 and the unsecure virtualization hypervisor 222. While the unified virtual machine image 230 is not as efficient with respect to memory access time relative to the mixed secure virtual machine image 202 (FIG. 5), by incorporating the mixed secure hypervisor 212 and the unsecure virtualization 222 with respective non-encrypted components 214, 224 and 226, the embodiment of FIG. 6 offers memory access speed advantages over prior art virtualization approaches that allocate all package data and/or code to encrypted memory resources and processes, including in response to determinations that any packages require security.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a virtual machine structure, the method comprising executing on a computer processor:
   creating an encrypted code virtualization machine for code machine instructions of a first retrieved package that has a security field value that indicates secure code, wherein the code machine instructions of the first retrieved package are allocated to encrypted code memory regions of a computer memory resource;
   creating a non-encrypted code virtualization machine in non-encrypted code memory regions of a computer memory resource comprising code machine instructions of a second retrieved package that has a security field value that does not indicate secure code; and
   defining a union mixed secure virtual machine image to comprise the encrypted code virtualization machine and the non-encrypted code virtualization machine.

2. The method of claim 1, further comprising:
   integrating computer-readable program code into a computer system comprising a processor, a computer readable memory in circuit communication with the processor, and a computer-readable storage medium in circuit communication with the processor; and
   wherein the processor executes program code instructions stored on the computer-readable storage medium via the computer readable memory and thereby performs the creating the encrypted code virtualization machine, the creating the non-encrypted code virtualization machine, and the defining the union mixed secure virtual machine image.

3. The method of claim 2, wherein the computer-readable program code is provided as a service in a cloud environment.

4. The method of claim 1, further comprising:
   retrieving, from a package repository, each of a plurality of packages that comprises the first and the second retrieved packages, wherein each of the plurality of retrieved packages comprise distributions of code and data comprising a security field value; creating a plurality of encrypted code virtualization machines, one for each of sets of code machine instructions of respective ones of the retrieved packages that have a security field value that indicates secure code, wherein the code machine instructions of the retrieved packages that have the security field value that indicate secure code are each allocated to different encrypted code memory regions of a computer memory resource, relative to others of the code machine instructions of the retrieved packages that have the security field value that indicates secure code;
   allocating code machine instructions from each of the retrieved packages that have security field values that do not indicate secure code to non-encrypted code memory regions of the non-encrypted code virtualization machine; and
   defining a union mixed secure virtual machine image to comprise the plurality of the encrypted code virtualization machines.

5. The method of claim 4, further comprising:
   storing data from each of the retrieved packages into an encrypted data storage device comprising encrypted data memory regions of a computer memory resource; and
   defining the union virtual machine image to comprise the encrypted data storage device.

6. The method of claim 4, further comprising:
   storing data, from each of a no-security subset of the retrieved packages that have a security field value that does not indicate secure data and does not indicate secure code, into a non-encrypted data storage device comprising a no-security subset of non-encrypted data memory regions of a computer memory resource;
   creating a no-security subset non-encrypted code virtualization machine in a no-security subset of non-encrypted code memory regions of a computer memory resource comprising code machine instructions of the no-security subset of the retrieved packages;
   defining an unsecure virtualization hypervisor comprising the non-encrypted data storage device and the no-security subset non-encrypted code virtualization machine; and defining the union virtual machine image to comprise the unsecure virtualization hypervisor.

7. The method of claim 4, wherein the security field value is selected from the group of strings values consisting of "all," "data" and "none".

8. The method of claim 7, wherein the retrieved packages comprise line-delimited format code portions that comprise the security field value in a "security: value" format.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
creates an encrypted code virtualization machine for code machine instructions of a first retrieved package that has a security field value that indicates secure code, wherein the code machine instructions of the first retrieved package are allocated to encrypted code memory regions of a computer memory resource;
creates a non-encrypted code virtualization machine in non-encrypted code memory regions of a computer memory resource comprising code machine instructions of a second retrieved package that has a security field value that does not indicate secure code; and
defines a union mixed secure virtual machine image to comprise the encrypted code virtualization machine and the non-encrypted code virtualization machine.

10. The system of claim 9, wherein the processor executes the program instructions stored on the computer-readable storage medium via the computer readable memory and thereby:
retrieves, from a package repository, each of a plurality of packages that comprises the first and the second retrieved packages, wherein each of the plurality of retrieved packages comprise distributions of code and data comprising a security field value;
creates a plurality of encrypted code virtualization machines, one for each of sets of code machine instructions of respective ones of the retrieved packages that have a security field value that indicates secure code, wherein the code machine instructions of the retrieved packages that have the security field value that indicate secure code are each allocated to different encrypted code memory regions of a computer memory resource, relative to others of the code machine instructions of the retrieved packages that have the security field value that indicates secure code;
allocates code machine instructions from each of the retrieved packages that have security field values that do not indicate secure code to non-encrypted code memory regions of the non-encrypted code virtualization machine; and
defines a union mixed secure virtual machine image to comprise the plurality of the encrypted code virtualization machines.

11. The system of claim 10, wherein the processor executes the program instructions stored on the computer-readable storage medium via the computer readable memory and thereby:
stores data from each of the retrieved packages into an encrypted data storage device comprising encrypted data memory regions of a computer memory resource; and defines the union virtual machine image to comprise the encrypted data storage device.

12. The system of claim 10, wherein the processor executes the program instructions stored on the computer-readable storage medium via the computer readable memory and thereby:
stores data, from each of a no-security subset of the retrieved packages that have a security field value that does not indicate secure data and does not indicate secure code, into a non-encrypted data storage device comprising a no-security subset of non-encrypted data memory regions of a computer memory resource;
creates a no-security subset non-encrypted code virtualization machine in a no-security subset of non-encrypted code memory regions of a computer memory resource comprising code machine instructions of the no-security subset of the retrieved packages;
defines an unsecure virtualization hypervisor comprising the non-encrypted data storage device and the no-security subset non-encrypted code virtualization machine; and
defines the union virtual machine image to comprise the unsecure virtualization hypervisor.

13. The system of claim 10, wherein the security field value is selected from the group of strings values consisting of "all," "data" and "none".

14. The system of claim 13, wherein the retrieved packages comprise line-delimited format code portions that comprise the security field value in a "security: value" format.

15. A computer program product for a virtual machine structure, the computer program product comprising:
a computer readable storage medium having computer readable program code embodied therewith, wherein the computer readable storage medium is not a transitory signal per se, the computer readable program code comprising instructions for execution by a processor that cause the processor to:
create an encrypted code virtualization machine for code machine instructions of a first retrieved package that has a security field value that indicates secure code, wherein the code machine instructions of the first retrieved package are allocated to encrypted code memory regions of a computer memory resource;
create a non-encrypted code virtualization machine in non-encrypted code memory regions of a computer memory resource comprising code machine instructions of a second retrieved package that has a security field value that does not indicate secure code; and
define a union mixed secure virtual machine image to comprise the encrypted code virtualization machine and the non-encrypted code virtualization machine.

16. The computer program product of claim 15, wherein the computer-readable program code instructions for execution by the processor further cause the processor to:
retrieve, from a package repository, each of a plurality of packages that comprises the first and the second retrieved packages, wherein each of the plurality of retrieved packages comprise distributions of code and data comprising a security field value;
create a plurality of encrypted code virtualization machines, one for each of sets of code machine instructions of respective ones of the retrieved packages that have a security field value that indicates secure code, wherein the code machine instructions of the retrieved packages that have the security field value that indicate secure code are each allocated to different encrypted code memory regions of a computer memory resource, relative to others of the code machine instructions of the retrieved packages that have the security field value that indicates secure code;

allocate code machine instructions from each of the retrieved packages that have security field values that do not indicate secure code to non-encrypted code memory regions of the non-encrypted code virtualization machine; and define a union mixed secure virtual machine image to comprise the plurality of the encrypted code virtualization machines.

17. The computer program product of claim 16, wherein the computer-readable program code instructions for execution by the processor further cause the processor t:

store data from each of the retrieved packages into an encrypted data storage device comprising encrypted data memory regions of a computer memory resource; and define the union virtual machine image to comprise the encrypted data storage device.

18. The computer program product of claim 16, wherein the computer-readable program code instructions for execution by the processor further cause the processor to:

store data, from each of a no-security subset of the retrieved packages that have a security field value that does not indicate secure data and does not indicate secure code, into a non-encrypted data storage device comprising a no-security subset of non-encrypted data memory regions of a computer memory resource;

create a no-security subset non-encrypted code virtualization machine in a no-security subset of non-encrypted code memory regions of a computer memory resource comprising code machine instructions of the no-security subset of the retrieved packages;

define an unsecure virtualization hypervisor comprising the non-encrypted data storage device and the no-security subset non-encrypted code virtualization machine; and define the union virtual machine image to comprise the unsecure virtualization hypervisor.

19. The computer program product of claim 16, wherein the security field value is selected from the group of strings values consisting of "all," "data" and "none".

20. The computer program product of claim 19, wherein the retrieved packages comprise line-delimited format code portions that comprise the security field value in a "security: value" format.

* * * * *